(12) United States Patent
Acharya

(10) Patent No.: US 7,274,393 B2
(45) Date of Patent: Sep. 25, 2007

(54) FOUR-COLOR MOSAIC PATTERN FOR DEPTH AND IMAGE CAPTURE

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 10/664,023

(22) Filed: Sep. 15, 2003

(65) Prior Publication Data

US 2004/0169749 A1 Sep. 2, 2004

Related U.S. Application Data

(63) Continuation-in-part of application No. 10/376,156, filed on Feb. 28, 2003.

(51) Int. Cl.
　　H04N 3/14　　(2006.01)
　　H04N 5/335　　(2006.01)
　　H04N 9/04　　(2006.01)
　　H04N 9/083　　(2006.01)
　　G01J 5/02　　(2006.01)
　　G01J 3/50　　(2006.01)
　　H01J 5/16　　(2006.01)

(52) U.S. Cl. ............... 348/273; 348/279; 250/339.05; 250/226

(58) Field of Classification Search ............ 250/208.1, 250/226, 339.02, 339.05; 348/273, 272, 348/279, 280; 356/419, 402; 257/294
See application file for complete search history.

(56) References Cited

U.S. PATENT DOCUMENTS

| | | | | |
|---|---|---|---|---|
| 5,373,322 A | * | 12/1994 | Laroche et al. | ............ 348/273 |
| 5,801,373 A | * | 9/1998 | Oozu et al. | ............. 250/208.1 |
| 5,875,122 A | | 2/1999 | Acharya | |
| 5,926,238 A | * | 7/1999 | Inoue et al. | ................. 349/61 |
| 5,995,210 A | | 11/1999 | Acharya | |
| 6,009,201 A | | 12/1999 | Acharya | |
| 6,009,206 A | | 12/1999 | Acharya | |
| 6,047,303 A | | 4/2000 | Acharya | |

(Continued)

OTHER PUBLICATIONS

Tinku Acharya, "A Memory Based VLSI Architecture for Image Compression," Filed Jun. 30, 1997, U.S. Appl. No. 08/885,415, pp. 1-36.

(Continued)

*Primary Examiner*—Ngoc-Yen Vu
*Assistant Examiner*—Gregory V Madden
(74) *Attorney, Agent, or Firm*—Blakely, Sokoloff, Taylor & Zafman LLP

(57) ABSTRACT

A sensor for color and depth information capture is disclosed. A filter passes selected wavelengths according to a predetermined pattern to the sensor. The sensor measures light intensities passed by the filter. In one embodiment, the wavelengths passed by the filter correspond to red, green, blue and infrared light. The intensity values can be used for interpolation operations to provide intensity values for areas not captured by the sensor. For example, in an area corresponding to a pixel for which an intensity of red light is captured, interpolation operations using neighboring intensity values can be used to provide an estimation of blue, green and infrared intensities. Red, green and blue intensity values, whether captured or interpolated, are used to provide visible color image information. Infrared intensity values, whether captured or interpolated, are used to provide depth and/or surface texture information.

48 Claims, 8 Drawing Sheets

| | 1 | 2 | 3 | 4 | 5 | 6 | 7 | 8 | 9 | 10 | 11 | 12 |
|---|---|---|---|---|---|---|---|---|---|---|---|---|
| 1 | B | R | B | R | B | R | B | R | B | R | B | R |
| 2 | IR | G | IR | G | IR | G | IR | G | IR | G | IR | G |
| 3 | B | R | B | R | B | R | B | R | B | R | B | R |
| 4 | IR | G | IR | G | IR | G | IR | G | IR | G | IR | G |
| 5 | B | R | B | R | B | R | B | R | B | R | B | R |
| 6 | IR | G | IR | G | IR | G | IR | G | IR | G | IR | G |
| 7 | B | R | B | R | B | R | B | R | B | R | B | R |
| 8 | IR | G | IR | G | IR | G | IR | G | IR | G | IR | G |
| 9 | B | R | B | R | B | R | B | R | B | R | B | R |
| 10 | IR | G | IR | G | IR | G | IR | G | IR | G | IR | G |
| 11 | B | R | B | R | B | R | B | R | B | R | B | R |
| 12 | IR | G | IR | G | IR | G | IR | G | IR | G | IR | G |

U.S. PATENT DOCUMENTS

| | | | |
|---|---|---|---|
| 6,091,851 A | 7/2000 | Acharya | |
| 6,094,508 A | 7/2000 | Acharya et al. | |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya | |
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |
| 6,236,765 B1 | 5/2001 | Acharya | |
| 6,269,181 B1 | 7/2001 | Acharya | |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,292,212 B1* | 9/2001 | Zigadlo et al. | 348/33 |
| 6,301,392 B1 | 10/2001 | Acharya | |
| 6,348,929 B1 | 2/2002 | Acharya et al. | |
| 6,351,555 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,481 B1 | 4/2002 | Tan et al. | |
| 6,377,280 B1 | 4/2002 | Acharya et al. | |
| 6,381,357 B1 | 4/2002 | Tan et al. | |
| 6,392,699 B1 | 5/2002 | Acharya | |
| 6,449,380 B1 | 9/2002 | Acharya et al. | |
| 6,535,648 B1 | 3/2003 | Acharya | |
| 6,659,940 B2* | 12/2003 | Adler | 600/109 |
| 6,759,646 B1* | 7/2004 | Acharya et al. | 250/226 |
| 7,109,470 B2* | 9/2006 | Kohler | 250/226 |

OTHER PUBLICATIONS

Bawolek et al., "Infrared Correction System," Filed Jul. 30, 1998, U.S. Appl. No. 09/126,203, pp. 1-23.

Pazmino et al., "Method of Compressing and/or Decompressing a Data Set Using Significance Mapping," Filed Sep. 11, 1998, U.S. Appl. No. 08/151,336, pp. 1-26.

Tan et al., "Robust Sequential Approach in Detecting Defective Pixels within an Image Sensor," Filed Nov. 13, 1998, U.S. Appl. No. 09/191,310, pp. 1-35.

Acharya et al., "Color Interpolation for a Four Color Mosaic Pattern," Filed Nov. 24, 1998, U.S. Appl. No. 09/199,836, pp. 1-26.

Tan et al., "Using an Electronic Camera to Build a File Containing Text," Filed Apr. 29, 1999, U.S. Appl. No. 09/301,753, pp. 1-21.

Tsai et al., "Method and Apparatus for Adaptively Sharpening an Image," Filed May 26, 1999, U.S. Appl. No. 09/320,192, pp. 1-29.

Tan et al., "Method and Appartus for Adaptively Sharpening Local Image Content of an Image," Filed Jun. 9, 1999, U.S. Appl. No. 09/328,935, pp. 1-29.

Tan et al., "A Hardware Efficient Wavelet-Based Video Compression Scheme," Filed Jun. 29, 1999, U.S. Appl. No. 09,342,863, pp. 1-32.

Tan et al., "A Methodlgy for Color Correction with Noise Regulation," Filed Jul. 23, 1999, U.S. Appl. No. 09/359,231, pp. 1-30.

Acharya et al., "Image Processing Method and Apparatus," Filed Jul. 23, 1999, U.S. Appl. No. 09/359,523, pp. 1-16.

Acharya et al., "Zerotree Encoding of Wavelet Data," Filed Sep. 3, 1999, U.S. Appl. No. 09/390,255, pp. 1-22.

Acharya et al., "A Fuzzy Based Thresholding Technique for Image Segmentation," Filed Sep. 10, 1999, U.S. Appl. No. 09/393,136, pp. 1-28.

Acharya et al., "A Fuzzy Distinction Based Thresholding Technique for Image Segmentation," Filed Sep. 10, 1999, U.S. Appl. No. 09/393,017, pp. 1-29.

Tinku Acharya, "Video Motion Estimation," Filed Sep. 27, 1999, U.S. Appl. No. 09/406,032, pp. 1-24.

Acharya et al., "Method of Intetpolating Color Pixel Signals from a Subsampled Color Image," Filed Oct. 1, 1999, U.S. Appl. No. 09/410,800.

Acharya et al., "Method of Compressing a Color Image," Filed Oct. 1, 1999, U.S. Appl. No. 09/411,697, pp. 1-26.

Acharya et al., "Square Root Raised Cosine Symmetric Filter for Mobile Telecommunications," Filed Oct. 29, 1999, U.S. Appl. No. 09/429,058, pp. 1-26.

Tinku Acharya, "Discrete Filter," Filed Nov. 2, 1999, U.S. Appl. No. 09/432,337, pp. 1-16.

Acharya et al., "Indexing Wavelet Compressed Video for Efficient Data Handling," Filed Nov. 10, 1999, U.S. Appl. No. 09/438,091, pp. 1-29.

Tinku Acharya, "Method of Upscaling a Color Image," Filed Dec. 14, 1999, U.S. Appl. No. 09/461,080, pp. 1-22.

Tinku Acharya, "Method of Converting a Sub-Sampled Color Image," Filed Dec. 14, 1999, U.S. Appl. No. 09/461,068, pp. 1-22.

Acharya et al., "Chip Rate Selectable Square Root Raised Cosine Filter for Mobile Telecommunications," Filed Dec. 20, 1999, U.S. Appl. No. 09/467,487, pp. 1-44.

Miao et al., "Dual Mode Filter for Mobile Telecommunications," Filed Nov. 18, 1999, U.S. Appl. No. 09/467,611, pp. 1-31.

Metz et al., "Image Processing Architecture," Filed Dec. 28, 1999, U.S. Appl. No. 09/473,643, pp. 1-16.

Tinku Acharya, "A Block-Matching Algorithum for Color Interpolation," Filed Jan. 28, 2000, U.S. Appl. No. 09/494,087, pp. 1-45.

Acharya et al., "Method of Inverse Quantizing Quantized Signal Samples of an Image During Image Decompression," filed Feb. 18, 2000, U.S. Appl. No. 09/507,213, pp. 1-32.

Acharya et al., "Method of Quantizing Signal Samples of an Image During Image Compression," Filed Feb. 18, 2000, U.S. Appl. No. 09/507,399, pp. 1-24.

Acharya et al., "Method of Integrating a Watermark into an Image," Filed Mar. 6, 2000, U.S. Appl. No. 09/519,874, pp. 1-27.

Acharya et al., "Method of Using Hue to Interpolate Color Pixel Signals," Filed Jun. 12, 2000, U.S. Appl. No. 09/591,867, pp. 1-23.

Kim et al., "Method of Performing Motion Estimation," Filed Jun. 16, 2000, U.S. Appl. No. 09/596,127, pp. 1-28.

Dunton et al., "Dual Mode Digital Camera for Video and Still Operation," Filed Jun. 16, 2000, U.S. Appl. No. 09/595,055, pp. 1-30.

Acharya et al., "Method of Compressing an Image," Filed Jun. 19, 2000, U.S. Appl. No. 09/597,354, pp. 1-23.

Acharya et al., "Method of Video Coding the Movement of a Human Face from a Sequence of Images," Filed Jun. 30, 2000, U.S. Appl. No. 09/608,989, pp. 1-25.

Acharya et al., "Method of Video Coding Shoulder Movement from a Sequence of Images," Filed Jun. 30, 2000, U.S. Appl. No. 09/607,724, pp. 1-24.

Acharya et al., "Model-Based Video Image Coding," Filed Jun. 30, 2000, U.S. Appl. No. 09/608,991, pp. 1-36.

Tinku Acharya, "Techniques to Implement One-Dimensional Compression," Filed Sep. 18, 2000, U.S. Appl. No. 09/666,486, pp. 1-18.

Acharya et al., "Imagaing Device Connected to Processor-Based System Using High-Bandwidth Bus," Filed Nov. 29, 2000, U.S. Appl. No. 09/726,773, pp. 1-31.

Acharya et al., "A Method for Block-Based Digital Image Watermarking," Filed Nov. 29, 2000, U.S. Appl. No. 09/727,288, pp. 1-11.

Acharya et al., "Color Filter Array & Color Interpolation Algorithm," Filed Nov. 30, 2000, U.S. Appl. No. 09/727,038, pp. 1-36.

Kim et al., "Method of Performing Video Encoding Rate Control," Filed Jan. 3, 2001, U.S. Appl. No. 09/754,227, pp. 1-28.

Kim et al., "Method of Performing Video Encoding Rate Control Using Motion Estimation," Filed Jan. 3, 2001, U.S. Appl. No. 09/754,683, pp. 1-27.

Kim et al., "Method of Performing Video Encoding Rate Control Using Bit Budget," Filed Jan. 3, 2001, U.S. Appl. No. 09/754,682, pp. 1-25.

Tinku Acharya, "Multiplierless Pyramid Filter," Filed Jan. 3, 2001, U.S. Appl. No. 09/754,684, pp. 1-22.

Acharya et al., "Image Retrieval Using Distance Measure," Filed Mar. 23, 2001, U.S. Appl. No. 09/817,000, pp. 1-28.

Tinku Acharya, "Two-Dimensional Pyramid Filter Architecture," Filed Mar. 26, 2001, U.S. Appl. No. 09/817,711, pp. 1-32.

Tinku Acharya, "Pyramid Filter," Filed Mar. 28, 2001, U.S. Appl. No. 09/820,108, pp. 1-23.

Tinku Acharya, "Two-Dimensional Pyramid Filter Architecture," Filed Mar. 30, 2001, U.S. Appl. No. 09/823,212, pp. 1-37.

Tinku Acharya, "Two-Dimensional Pyramid Filter Architecture," Filed Mar. 30, 2001, U.S. Appl. No. 09/823,390, pp. 1-38.

Tinku Acharya, "Two-Dimensional Pyramid Filter Architecture," Filed Apr. 30, 2001, U.S. Appl. No. 09/846,609, pp. 1-37.

Tan et al., "Reduction of Ringing Artifacts After Decompression of a DWT-Based Compressed Image," Filed May 22, 2001, U.S. Appl. No. 09/863,478, pp. 1-24.

Acharya et al., "Method & Apparatus for Coding of Wavelet Transformed Coefficients," Filed May 29, 2001, U.S. Appl. No. 09/867,781, pp. 1-44.

Acharya et al., "Method & Apparatus for Three-Dimensional Wavelet Transform," Filed May 29, 2001, U.S. Appl. No. 09/867,784, pp. 1-30.

Tinku Acharya, "Techniques to Implement Two-Dimensional Compression," Filed Sep. 18, 2000, U.S. Appl. No. 09/664,131, pp. 1-24.

Tinku Acharya, "SAD Computation Architectue," Filed Sep. 29, 2000, U.S. Appl. No. 09/677,829, pp. 1-24.

Tinku Acharya, "SAD Computation Architecture," Filed Sep. 29, 2000, U.S. Appl. No. 09/677,830, pp. 1-27.

Acharya et al., "A Method of Generating Huffman Code Length Information," Filed Oct. 31, 2000, U.S. Appl. No. 09/704,392, pp. 1-25.

Acharya et al., "A Method of Performing Huffman Decoding," Filed Oct. 31, 2000, U.S. Appl. No. 09/704,380, pp. 1-26.

Acharya et al., "Method of Generating a Length-Constrained Huffman Coed," Filed Nov. 30, 2000, U.S. Appl. No. 09/705,314, pp. 1-17.

Tinku Acharya, "Method & Apparatus for Two-Dimensional Seperable Symmetric Filtering," Filed Nov. 15, 2000, U.S. Appl. No. 09/713,663, pp. 1-20.

Tinku Acharya, "Method & Apparatus for Multiply-Accumulate Two-Dimensional Separable Symmetric Filtering," Filed Nov. 20, 2000, U.S. Appl. No. 09/718,877, pp. 1-13.

Acharya et al., "Developing an Euler Vector for Images," Filed Nov. 27, 2000, U.S. Appl. No. 09/722,979, pp. 1-45.

Acharya et al., "Computing the Euler Number of a Binary Image," Filed Nov. 27, 2000, U.S. Appl. No. 09/722,982, pp. 1-31.

Acharya et al., "Wavelet Coding of Video," Filed Nov. 27, 2000, U.S. Appl. No. 09/722,988, pp. 1-40.

Acharya et al., "Encoding of Wavelet Transformed Error Data," Filed Nov. 27, 2000, U.S. Appl. No. 09/723,123, pp. 1-38.

Tinku Acharya, "Method & Apparatus for Image Scaling," Filed Jul. 27, 2001, U.S. Appl. No. 09/917,476, pp. 1-19.

Becker et al., "Variable Length Coding Packing Architecture," Filed Aug. 22, 2001, U.S. Appl. No. 09/935,524, pp. 1-29.

Tinku Acharya, "Fast Half-Pixel Motion Estimation Using Steepest Descent," Filed Sep. 5, 2001, U.S. Appl. No. 09/947,266, pp. 1-18.

Tinku Acharya, "Signal to Noise Ration Optimization for Video Compression Bit-Rate Control," Filed Sep. 5, 2001, U.S. Appl. No. 09/947,331, pp. 1-25.

Acharya et al., "Method & Apparatus for Providing a Binary Fingerprint Image," Filed Sep. 13, 2001, U.S. Appl. No. 09/952,284, pp. 1-26.

Acharya et al., "Method & Apparatus to Reduce False Minutiae in a Binary Fingerprint Image," Filed Sep. 13, 2001, U.S. Appl. No. 09/952,249, pp. 1-30.

Acharya et al., "Architecture for Processing Fingerprint Images," Filed Sep. 13, 2001, U.S. Appl. No. 09/952,276, pp. 1-19.

Tinku Acharya, "An Integrated Color Interpolation & Color Space Conversion Algorithm from 8-Bit Bayer Pattern RGB Color Space to 12-Bit YCrCb Color Space," Filed Dec. 14, 2001, U.S. Appl. No. 10/022,154, pp. 1-32

Kim et al., "Method & Apparatus for Video Bit-Rate Control," Filed Dec. 28, 2001, U.S. Appl. No. 10/039,462, pp. 1-23.

Wang et al., "Progressive Two-Dimensional (2D) Pyramid Filter," Filed Dec. 28, 2001, U.S. Appl. No. 10/039,434, pp. 1-26.

Acharya et al., "Color Video Coding Scheme," Filed Jul. 25, 2002, U.S. Appl. No. 10/206,908, pp. 1-31.

Acharya et al., "Computationally Fast & Effiecient DV to DVD Transcoding," Filed Apr. 11, 2002, U.S. Appl. No. 10/120,799, pp. 1-46.

Acharya et al., "Method & Apparatus for Image Retrieval," Filed Apr. 22, 2002, U.S. Appl. No. 10/128,601, pp. 1-27.

Acharya et al., "Method of Integrating a Watermark into a Compressed Image," Filed Jul. 12, 2002, U.S. Appl. No. 10/194,179, pp. 1-25.

Tinku Acharya, "Sub-Sampled Infrared Sensor for Use in a Digital Image Capture Device," Filed Feb. 28, 2003, U.S. Appl. No. 10/376,127, pp. 1-33.

Acharya et al., "Image Color Matching Scheme," Filed Aug. 2, 2002, U.S. Appl. No. 10/211,161, pp. 1-14.

Acharya et al., "Motion Estimation," Filed Sep. 4, 2002, U.S. Appl. No. 10/235,121, pp. 1-22.

Acharya et al., "Motion Estimation Using a Logarithmic Search," Filed Sep. 11, 2002, U.S. Appl. No. 10/242,148, pp. 1-25.

Acharya et al., "Motion Estimation Using A Context Adaptive Search," Filed Sep. 23, 2002, U.S. Appl. No. 10/253,835, pp. 1-25.

Acharya, "Euler Vector for Color Images," Filed Oct. 23, 2002, U.S. Appl. No. 10/279,536, pp. 1-16.

Acharya, "Method & Apparatus for Image Scaling," Filed Jul. 27, 2001, U.S. Appl. No. 09/917,476, pp. 1-19.

Acharya, "Enhancing Image Compression Performance by Morphological Processing," Filed Apr. 14, 1999, U.S. Appl. No. 09/291,810, pp. 1-31.

Tan et al., "Reduction of Ringing Artifacts After Decompression of a DWT-Based Compressed Image," Filed Oct. 2, 1998, U.S. Appl. No. 09/165,511, pp. 1-20.

Kim et al., "Adaptive Video Bit-Rate Control," Filed Sep. 23, 2002, U.S. Appl. No. 10/253,943, pp. 1-32.

* cited by examiner

|   | 1 | 2 | 3 | 4 |
|---|---|---|---|---|
| 1 | G | B | G | B |
| 2 | R | G | R | G |
| 3 | G | B | G | B |
| 4 | R | G | R | G |

FIG. 1

|   | 1 | 2 | 3 | 4 | 5 | 6 | 7 | 8 | 9 | 10 | 11 | 12 |
|---|---|---|---|---|---|---|---|---|---|---|---|---|
| 1 | B | G | R | G | B | G | R | G | B | G | R | G |
| 2 | G | IR | G | IR | G | IR | G | IR | G | IR | G | IR |
| 3 | R | G | B | G | R | G | B | G | R | G | B | G |
| 4 | G | IR | G | IR | G | IR | G | IR | G | IR | G | IR |
| 5 | B | G | R | G | B | G | R | G | B | G | R | G |
| 6 | G | IR | G | IR | G | IR | G | IR | G | IR | G | IR |
| 7 | R | G | B | G | R | G | B | G | R | G | B | G |
| 8 | G | IR | G | IR | G | IR | G | IR | G | IR | G | IR |
| 9 | B | G | R | G | B | G | R | G | B | G | R | G |
| 10 | G | IR | G | IR | G | IR | G | IR | G | IR | G | IR |
| 11 | R | G | B | G | R | G | B | G | R | G | B | G |
| 12 | G | IR | G | IR | G | IR | G | IR | G | IR | G | IR |
| 13 | B | G | R | G | B | G | R | G | B | G | R | G |

FIG. 2

|    | 1  | 2 | 3  | 4 | 5  | 6 | 7  | 8 | 9  | 10 | 11 | 12 |
|----|----|---|----|---|----|---|----|---|----|----|----|----|
| 1  | B  | R | B  | R | B  | R | B  | R | B  | R  | B  | R  |
| 2  | IR | G | IR | G | IR | G | IR | G | IR | G  | IR | G  |
| 3  | B  | R | B  | R | B  | R | B  | R | B  | R  | B  | R  |
| 4  | IR | G | IR | G | IR | G | IR | G | IR | G  | IR | G  |
| 5  | B  | R | B  | R | B  | R | B  | R | B  | R  | B  | R  |
| 6  | IR | G | IR | G | IR | G | IR | G | IR | G  | IR | G  |
| 7  | B  | R | B  | R | B  | R | B  | R | B  | R  | B  | R  |
| 8  | IR | G | IR | G | IR | G | IR | G | IR | G  | IR | G  |
| 9  | B  | R | B  | R | B  | R | B  | R | B  | R  | B  | R  |
| 10 | IR | G | IR | G | IR | G | IR | G | IR | G  | IR | G  |
| 11 | B  | R | B  | R | B  | R | B  | R | B  | R  | B  | R  |
| 12 | IR | G | IR | G | IR | G | IR | G | IR | G  | IR | G  |

FIG. 5

|    | 1  | 2  | 3  | 4  | 5  | 6  | 7  | 8  | 9  | 10 | 11 | 12 |
|----|----|----|----|----|----|----|----|----|----|----|----|----|
| 1  | IR | R  | IR | B  | IR | R  | IR | B  | IR | R  | IR | B  |
| 2  | G  | IR | G  | IR | G  | IR | G  | IR | G  | IR | G  | IR |
| 3  | IR | B  | IR | R  | IR | B  | IR | R  | IR | B  | IR | R  |
| 4  | G  | IR | G  | IR | G  | IR | G  | IR | G  | IR | G  | IR |
| 5  | IR | R  | IR | B  | IR | R  | IR | B  | IR | R  | IR | B  |
| 6  | G  | IR | G  | IR | G  | IR | G  | IR | G  | IR | G  | IR |
| 7  | IR | B  | IR | R  | IR | B  | IR | R  | IR | B  | IR | R  |
| 8  | G  | IR | G  | IR | G  | IR | G  | IR | G  | IR | G  | IR |
| 9  | IR | R  | IR | B  | IR | R  | IR | B  | IR | R  | IR | B  |
| 10 | G  | IR | G  | IR | G  | IR | G  | IR | G  | IR | G  | IR |
| 11 | IR | B  | IR | R  | IR | B  | IR | R  | IR | B  | IR | R  |
| 12 | G  | IR | G  | IR | G  | IR | G  | IR | G  | IR | G  | IR |

FIG. 6

|    | 1  | 2  | 3  | 4  | 5  | 6  | 7  | 8  | 9  | 10 | 11 | 12 |
|----|----|----|----|----|----|----|----|----|----|----|----|----|
| 1  | B  | R  | B  | R  | B  | R  | B  | R  | B  | R  | B  | R  |
| 2  | G  | IR | G  | IR | G  | IR | G  | IR | G  | IR | G  | IR |
| 3  | B  | R  | B  | R  | B  | R  | B  | R  | B  | R  | B  | R  |
| 4  | G  | IR | G  | IR | G  | IR | G  | IR | G  | IR | G  | IR |
| 5  | B  | R  | B  | R  | B  | R  | B  | R  | B  | R  | B  | R  |
| 6  | G  | IR | G  | IR | G  | IR | G  | IR | G  | IR | G  | IR |
| 7  | B  | R  | B  | R  | B  | R  | B  | R  | B  | R  | B  | R  |
| 8  | G  | IR | G  | IR | G  | IR | G  | IR | G  | IR | G  | IR |
| 9  | B  | R  | B  | R  | B  | R  | B  | R  | B  | R  | B  | R  |
| 10 | G  | IR | G  | IR | G  | IR | G  | IR | G  | IR | G  | IR |
| 11 | B  | R  | B  | R  | B  | R  | B  | R  | B  | R  | B  | R  |
| 12 | G  | IR | G  | IR | G  | IR | G  | IR | G  | IR | G  | IR |

FIG. 7

|   | 1 | 2 | 3 | 4 | 5 | 6 | 7 | 8 | 9 | 10 | 11 | 12 |
|---|---|---|---|---|---|---|---|---|---|---|---|---|
| 1 | B | G | B | G | B | G | B | G | B | G | B | G |
| 2 | IR | R | IR | R | IR | R | IR | R | IR | R | IR | R |
| 3 | B | G | B | G | B | G | B | G | B | G | B | G |
| 4 | IR | R | IR | R | IR | R | IR | R | IR | R | IR | R |
| 5 | B | G | B | G | B | G | B | G | B | G | B | G |
| 6 | IR | R | IR | R | IR | R | IR | R | IR | R | IR | R |
| 7 | B | G | B | G | B | G | B | G | B | G | B | G |
| 8 | IR | R | IR | R | IR | R | IR | R | IR | R | IR | R |
| 9 | B | G | B | G | B | G | B | G | B | G | B | G |
| 10 | IR | R | IR | R | IR | R | IR | R | IR | R | IR | R |
| 11 | B | G | B | G | B | G | B | G | B | G | B | G |
| 12 | IR | R | IR | R | IR | R | IR | R | IR | R | IR | R |

FIG. 8

FOUR-COLOR MOSAIC PATTERN FOR DEPTH AND IMAGE CAPTURE

This U.S. Patent application is a continuation-in-part of U.S. patent application Ser. No. 10/376,156, filed Feb. 28, 2003, entitled "FOUR-COLOR MOSAIC PATTERN FOR DEPTH AND IMAGE CAPTURE."

RELATED APPLICATIONS

This U.S. Patent application is related to U.S. patent application Ser. No. 10/376,127, filed Feb. 28, 2003, entitled "SUB-SAMPLED INFRARED SENSOR FOR USE IN A DIGITAL IMAGE CAPTURE DEVICE."

TECHNICAL FIELD

The invention relates to the field of image capture. More particularly, the invention relates to a sensor for capture of an image and depth information and uses thereof.

BACKGROUND

Digital cameras and other image capture devices operate by capturing electromagnetic radiation and measuring the intensity of the radiation. The spectral content of electromagnetic radiation focused onto a focal plane depends on, among other things, the image to be captured, the illumination of the subject, the transmission characteristics of the propagation path between the image subject and the optical system, the materials used in the optical system, as well as the geometric shape and size of the optical system.

For consumer imaging systems (e.g., digital cameras) the spectral range of interest is the visible region of the electromagnetic spectrum. A common method for preventing difficulties caused by radiation outside of the visual range is to use ionically colored glass or a thin-film optical coating on glass to create an optical element that passes visible light (typically having wavelengths in the range of 380 nm to 780 nm). This element can be placed in front of the taking lens, within the lens system, or it can be incorporated into the imager package. The principal disadvantage to this approach is increased system cost and complexity.

A color filter array (CFA) is an array of filters deposited over a pixel sensor array so that each pixel sensor is substantially sensitive to only the electromagnetic radiation passed by the filter. A filter in the CFA can be a composite filter manufactured from multiple filters so that the transfer function of the resulting filter is the product of the transfer functions of the constituent filters. Each filter in the CFA passes electromagnetic radiation within a particular spectral range (e.g., wavelengths that are interpreted as red). For example, a CFA may be composed of red, green and blue filters so that the pixel sensors provide signals indicative of the visible color spectrum.

If there is not an infrared blocking element somewhere in the optical chain infrared (IR) radiation (typically considered to be light with a wavelength greater than 780 nm) may also be focused on the focal plane. Imaging sensors or devices based on silicon technology typically require the use of infrared blocking elements to prevent IR from entering the imaging array. Silicon-based devices will typically be sensitive to light with wavelengths up to 1200 nm. If the IR is permitted to enter the array, the device will respond to the IR and generate an image signal including the IR.

In current three-dimensional cameras, the depth information is captured separately from the color information. For example, a camera can capture red, green and blue (visible color) images at fixed time intervals. Pulses of IR light are transmitted between color image captures to obtain depth information. The photons from the infrared light pulse are collected between the capture of the visible colors.

The number of bits available to the analog-to-digital converter determines the depth increments that can be measured. By applying accurate timing to cut off imager integration, the infrared light can directly carry shape information. By controlling the integration operation after pulsing the IR light, the camera can determine what interval of distance will measure object depth and such a technique can provide the shape of the objects in the scene being captured. This depth generation process is expensive and heavily dependent on non-silicon, mainly optical and mechanical systems for accurate shutter and timing control.

BRIEF DESCRIPTION OF THE DRAWINGS

The invention is illustrated by way of example, and not by way of limitation, in the figures of the accompanying drawings in which like reference numerals refer to similar elements.

FIG. 1 is an example Bayer pattern that can be used to capture color image data.

FIG. 2 illustrates one embodiment of a sub-sampling pattern that can be used to capture color and depth information.

FIG. 5 illustrates one embodiment of a sub-sampling pattern that can be used to capture color and depth information.

FIG. 6 illustrates one embodiment of a sub-sampling pattern that can be used to capture color and depth information.

FIG. 7 illustrates one embodiment of a sub-sampling pattern that can be used to capture color and depth information.

FIG. 8 illustrates one embodiment of a sub-sampling pattern that can be used to capture color and depth information.

DETAILED DESCRIPTION

Figure 3:
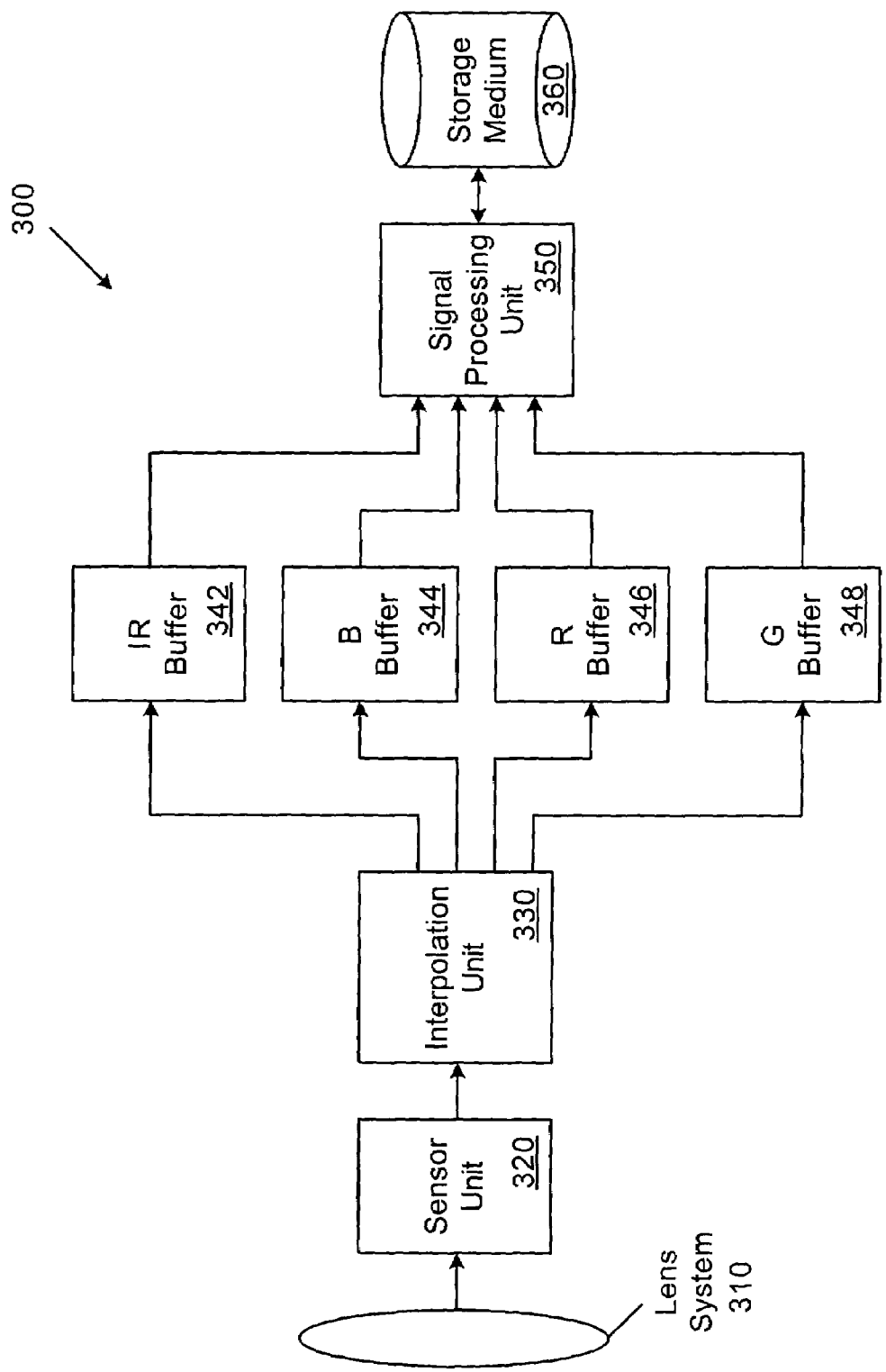
FIG. 3 is a block diagram of one embodiment of an image capture device.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

A sensor for color and depth information capture is disclosed. A filter passes selected wavelengths according to a predetermined pattern to the sensor. The sensor measures light intensities passed by the filter. In one embodiment, the wavelengths passed by the filter correspond to red, green, blue and infrared light. The intensity values can be used for interpolation operations to provide intensity values for areas not captured by the sensor. For example, in an area corresponding to a pixel for which an intensity of red light is captured, interpolation operations using neighboring intensity values can be used to provide an estimation of blue, green and infrared intensities. Red, green and blue intensity values, whether captured or interpolated, are used to provide visible color image information. Infrared intensity values, whether captured or interpolated, are used to provide depth and/or surface texture information.

A color image pixel consists of three basic color components—red, green and blue. High-end digital cameras capture these colors with three independent and parallel sensors each capturing a color plane for the image being captured. However, lower-cost image capture devices use sub-sampled color components so that each pixel has only one color component captured and the two other missing color components are interpolated based on the color information from the neighboring pixels. One pattern commonly used for sub-sampled color image capture is the Bayer pattern.

Figure 1:
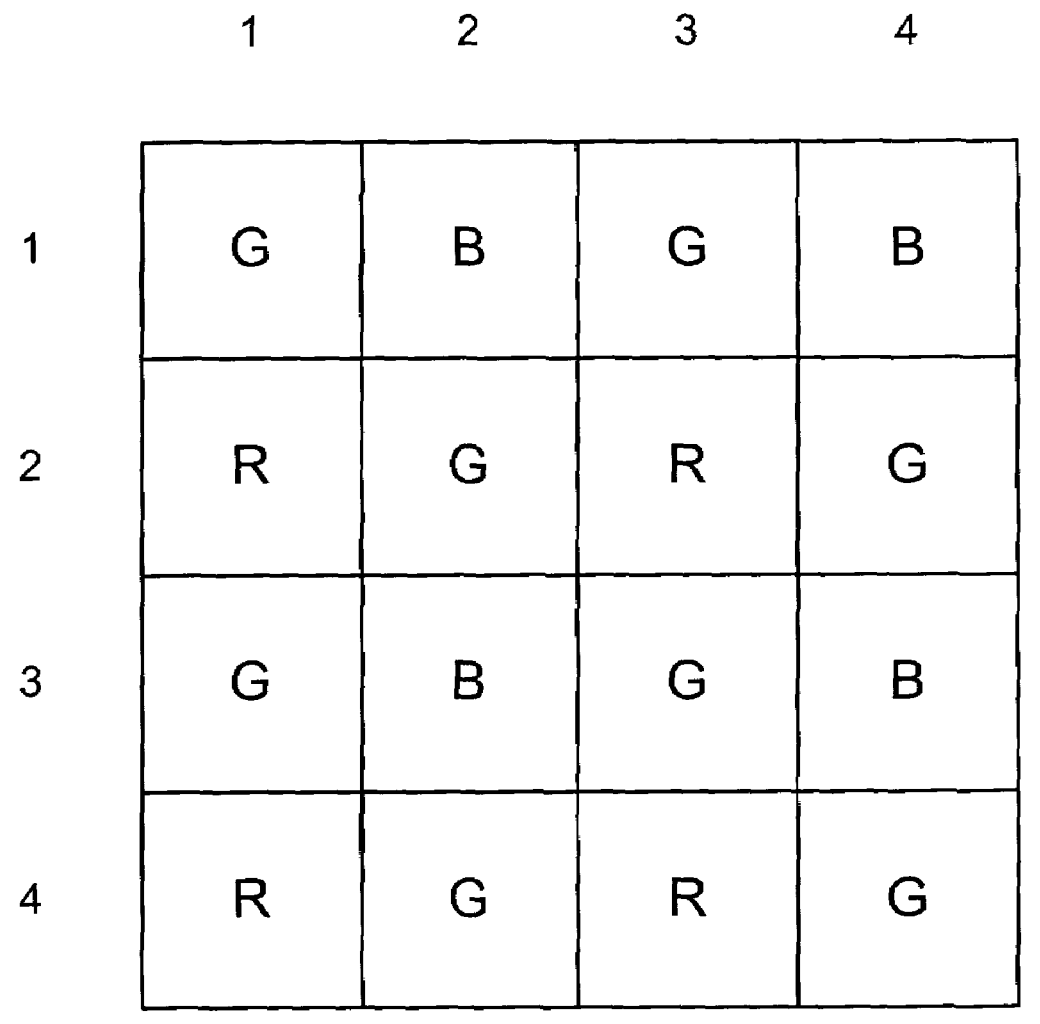

FIG. 1 is an example Bayer pattern that can be used to capture color image data. In the description herein sensors are described as capturing color intensity values for individual pixels. The areas for which color intensity is determined can be of any size or shape.

Each pixel in the Bayer pattern consists of only one color component—either red (R), green (G) or blue (B). The missing components are reconstructed based on the values of the neighboring pixel values. For example, the pixel at location (3,2) contains only blue intensity information and the red and green components have been filtered out.

The missing red information can be obtained by interpolation. For example, the red intensity information can be obtained by determining the average intensity of the four adjacent red pixels at locations (2,1), (2,3), (4,1) and (4,3). Similarly, the missing green intensity information can be obtained by determining the average intensity of the four adjacent green pixels at locations (2,2), (3,1), (3,3) and (4,2). Other, more complex interpolation techniques can also be used. However, an image capture device using the standard Bayer pattern cannot capture depth information without additional components, which increases the cost and complexity of the device.

FIG. 2 illustrates one embodiment of a sub-sampling pattern that can be used to capture color and depth information. Use of a four-color (R, G, B, IR) mosaic pattern can be used to capture color information and depth information using a single sensor. As described in greater detail below, missing color intensity information can be interpolated using neighboring intensity values. In one embodiment, intensity values for the four colors are captured contemporaneously.

For example, the pixel in location (7,3) corresponds to blue intensity information (row 7 and column 3). Thus, it is necessary to recover green and red intensity information in order to provide a full color pixel. Recovery of IR intensity information provides depth information. In one embodiment the average intensity of the values of the four neighboring green pixel locations (7,2), (7,4), (6,3) and (8,3) is used for the green intensity value of pixel (7,3). Similarly, the average of the intensity values of the nearest neighbor red pixel locations (7,1), (7,5), (5,3) and (9,3) is used for the red intensity value of pixel (7,3). The IR intensity information for pixel (7,3) can be determined as the average intensity of the nearest neighbor IR pixel locations (6,2), (6,4), (8,2) and (8,4).

One embodiment of a technique for interpolating color and/or depth information follows. In the equations that follow, "IR" indicates an interpolated intensity value for the pixel at location (m,n) unless the equation is IR=X(m,n), which indicates a captured infrared value. The equations for red, green and blue follow the same convention. Alternate techniques can also be used.

For the pixel X(m,n) in location (m,n):
case 1: (both m and n are odd integers)

$$IR = \frac{X(m-1, n-1) + X(m+1, n-1) + X(m-1, n+1) + X(m+1, n+1)}{4};$$

$$G = \frac{X(m-1, n) + X(m+1, n) + X(m, n-1) + X(m, n+1)}{4};$$

if X(m,n) is RED, then

R=X(m,n);

$$B = \frac{X(m-2, n) + X(m+2, n) + X(m, n-2), X(m, n+2)}{4};$$

else

B=X(m,n);

$$R = \frac{X(m-2, n) + X(m+2, n) + X(m, n-2), X(m, n+2)}{4};$$

end if
case 2: (m is odd and n is even)

$$IR = \frac{X(m-1, n) + X(m+1, n)}{2};$$

G=X(m,n);

if X(m,n−1) is RED, then

R=X(m,n−1);

B=X(m,n+1);

else

B=X(m,n−1);

R=X(m,n+1);

end if
case 3: (m is even and n is odd)

$$IR = \frac{X(m, n-1) + X(m, n+1)}{2};$$

G=X(m,n);

if X(m−1,n) is RED, then

R=X(m−1,n);

B=X(m+1,n);

else

B=X(m−1,n);

R=X(m+1,n);

end if case 4: (both m and n are even integers)

$$IR = X(m,n);$$

$$G = \frac{X(m-1, n) + X(m+1, n) + X(m, n-1) + X(m, n+1)}{4};$$

if X(m−1,n+1) is RED, then $$R = \frac{X(m-1, n+1) + X(m+1, n-1)}{2};$$

$$B = \frac{X(m-1, n-1) + X(m+1, n+1)}{2};$$

else $$B = \frac{X(m-1, n+1) + X(m+1, n-1)}{2};$$

$$R = \frac{X(m-1, n-1) + X(m+1, n+1)}{2};$$

end if end

FIG. 3 is a block diagram of one embodiment of an image capture device. Lens system 310 focuses light from a scene on sensor unit 320. Any type of lens system known in the art for taking images can be used. Sensor unit 320 includes one or more sensors and one or more filters such that the image is captured using the pattern of FIG. 2 or similar pattern. In one embodiment, sensor unit 320 includes a complementary metal-oxide semiconductor (CMOS) sensor and a color filter array. Sensor unit 320 captures pixel color information in the pattern described above. Color intensity information from sensor unit 320 can be output from sensor unit 320 and sent to interpolation unit 330 in any manner known in the art.

Interpolation unit 330 is coupled with sensor unit 320 to interpolate the pixel color information from the sensor unit. In one embodiment, interpolation unit 330 operates using the equations set forth above. In alternate embodiments, other interpolation equations can also be used. Interpolation of the pixel data can be performed in series or in parallel. The collected and interpolated pixel data are stored in the appropriate buffers coupled with interpolation unit 330.

In one embodiment, interpolation unit 330 is implemented as hardwired circuitry to perform the interpolation operations described herein. In an alternate embodiment, interpolation unit 330 is a general purpose processor or microcontroller that executes instructions that cause interpolation unit 330 to perform the interpolation operations described herein. The interpolation instructions can be stored in a storage medium in, or coupled with, image capture device 300, for example, storage medium 360. As another alternative, interpolation unit 330 can perform the interpolation operations as a combination of hardware and software.

Infrared pixel data is stored in IR buffer 342, blue pixel data is stored in B buffer 344, red pixel data is stored in R buffer 346 and green pixel data is stored in G buffer 348. The buffers are coupled with signal processing unit 350, which performs signal processing functions on the pixel data from the buffers. Any type of signal processing known in the art can be performed on the pixel data.

The red, green and blue color pixel data are used to generate color images of the scene captured. The infrared pixel data are used to generate depth and/or texture information. Thus, using the four types of pixel data (R-G-B-IR), an image capture device can capture a three-dimensional image.

In one embodiment, the processed pixel data are stored on storage medium 360. Alternatively, the processed pixel data can be displayed by a display device (not shown in FIG. 3), transmitted by a wired or wireless connection via an appropriate interface (not shown in FIG. 3), or otherwise used.

Figure 4:
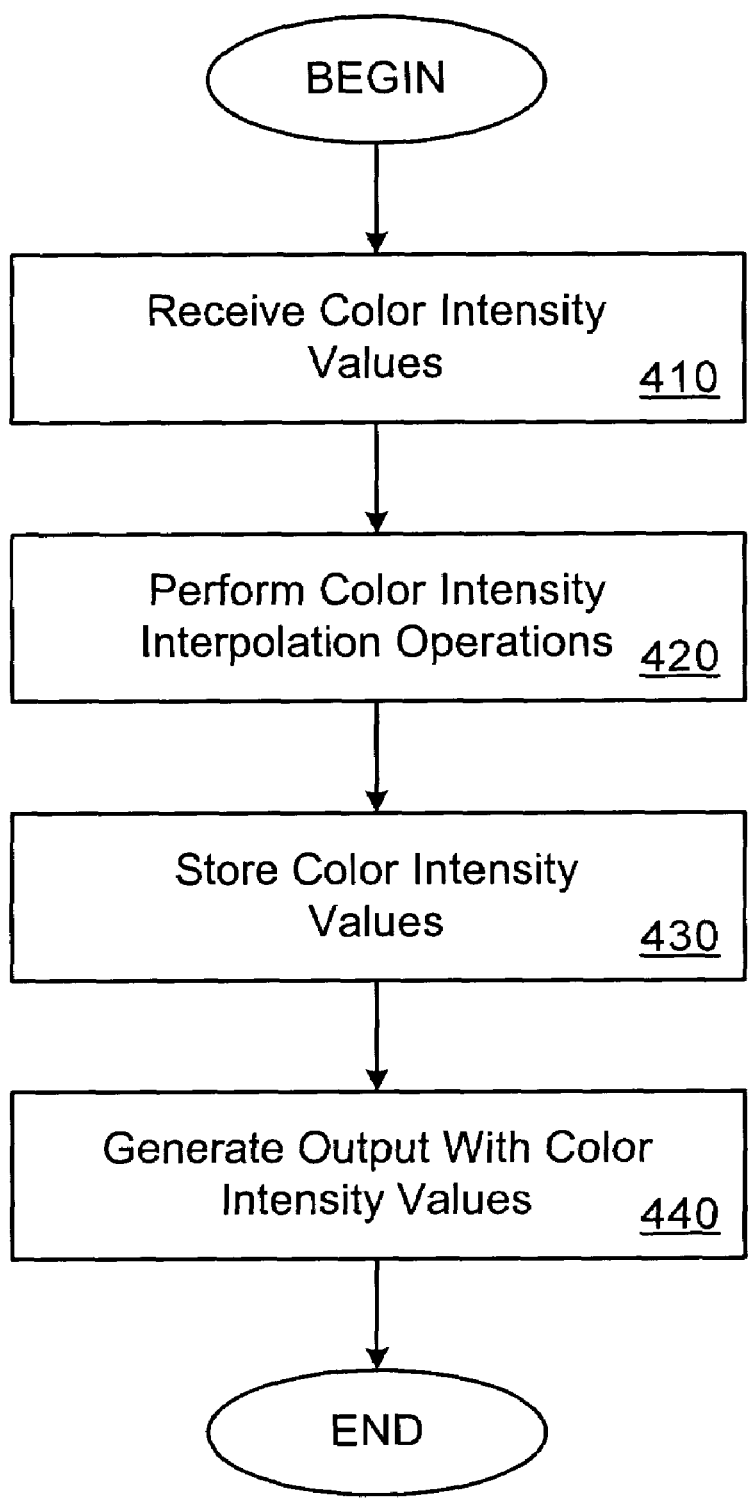
FIG. 4 is a flow diagram of one embodiment of an image capture operation that includes interpolation of multiple color intensity values including infrared intensity values.

FIG. 4 is a flow diagram of one embodiment of an image capture operation that includes interpolation of multiple light intensity values including infrared intensity values. The process of FIG. 4 can be performed by any device that can be used to capture an image in digital format, for example, a digital camera, a digital video camera, or any other device having digital image capture capabilities.

Color intensity values are received by the interpolation unit, 410. In one embodiment, light from an image to be captured is passed through a lens to a sensor. The sensor can be, for example, a complementary metal-oxide semiconductor (CMOS) sensor a charge-coupled device (CCD), etc. The intensity of the light passed to the sensor is captured in multiple locations on the sensor. In one embodiment, light intensity is captured for each pixel of a digital image corresponding to the image captured.

In one embodiment, each pixel captures the intensity of light corresponding to a single wavelength range (e.g., red light, blue light, green light, infrared light). The colors corresponding to the pixel locations follows a predetermined pattern. One pattern that can be used is described with respect to FIG. 2. The pattern of the colors can be determined by placing one or more filters (e.g., a color filter array) between the image and the sensor unit. Alternate patterns are described below with respect to FIGS. 5, 6, 7 and 8. Additional alternate patterns can also be used.

The captured color intensity values from the sensor unit are sent to an interpolation unit in any manner known in the art. The interpolation unit performs color intensity interpolation operations on the captured intensity values, 420. In one embodiment, the interpolation operations are performed for the pattern of FIG. 2 as described with respect to the equations above. For the patterns of FIGS. 5, 6, 7 and 8 corresponding alternate interpolation equations are provided below. In additional alternate embodiments, for example, with a different color intensity pattern, other interpolation equations can be used.

The sensor unit captures intensity values for visible colors as well as for infrared wavelengths. In one embodiment, the visible color intensities are interpolated such that each of the pixel locations have two interpolated color intensity values and one captured color intensity value. In alternate embodiments, color intensity values can be selectively interpolated such that one or more of the pixel locations does not have two interpolated color intensity values.

The infrared intensity values are also interpolated as described herein. The infrared intensity values provide depth, or distance information, that can allow the surface features of the image to be determined. In one embodiment, an infrared value is either captured or interpolated for each pixel location. In alternate embodiments, the infrared values can be selectively interpolated.

The captured color intensity values and the interpolated color intensity values are stored in a memory, 430. The color intensity values can be stored in a memory that is part of the capture device or the memory can be external to, or remote from, the capture device. In one embodiment, four buffers are used to store red, green, blue and infrared intensity data. In alternate embodiments, other storage devices and/or techniques can be used.

An output image is generated using, for example, a signal processing unit, from the stored color intensity values, 440. In one embodiment, the output image is a reproduction of the image captured; however, one or more "special effects" changes can be made to the output image. The output image can be displayed, stored, printed, etc.

FIG. 5 illustrates one embodiment of a sub-sampling pattern that can be used to capture color and depth information. Use of a four-color (R, G, B, IR) mosaic pattern can be used to capture color information and depth information using a single sensor. As described in greater detail below, missing color intensity information can be interpolated using neighboring intensity values. In one embodiment, intensity values for the four colors are captured contemporaneously.

One embodiment of a technique for interpolating color and/or depth information follows. Alternate techniques can also be used.

For the pixel X(m,n) in location (m,n):
case 1: (both m and n are odd integers)

$$IR = \frac{X(m-1, n) + X(m+1, n)}{2};$$

$$R = \frac{X(m, n-1) + X(m, n+1)}{2};$$

$$G = \frac{X(m-1, n-1) + X(m-1, n+1) + X(m+1, n-1) + X(m+1, n+1)}{4};$$

$$B = X(m,n);$$

case 2: (m is odd and n is even)

$$IR = \frac{X(m-1, n-1) + X(m+1, n-1) + X(m-1, n+1) + X(m+1, n+1)}{4};$$

$$R = X(m,n);$$

$$G = \frac{X(m-1, n) + X(m+1, n)}{2};$$

$$B = \frac{X(m, n-1) + X(m, n+1)}{2};$$

case 3: (m is even and n is odd)

$$IR = X(m,n);$$

$$R = \frac{X(m-1, n-1) + X(m+1, n-1) + X(m-1, n+1) + X(m+1, n+1)}{4};$$

$$G = \frac{X(m, n-1) + X(m, n+1)}{2};$$

$$B = \frac{X(m-1, n) + X(m+1, n)}{2};$$

case 4: (both m and n are even integers)

$$IR = \frac{X(m, n-1) + X(m, n+1)}{2};$$

$$R = \frac{X(m-1, n) + X(m+1, n)}{2};$$

$$G = X(m,n);$$

$$B = \frac{X(m-1, n-1) + X(m+1, n-1) + X(m-1, n+1) + X(m+1, n+1)}{4};$$

end

FIG. 6 illustrates one embodiment of a sub-sampling pattern that can be used to capture color and depth information. Use of a four-color (R, G, B, IR) mosaic pattern can be used to capture color information and depth information using a single sensor. As described in greater detail below, missing color intensity information can be interpolated using neighboring intensity values. In one embodiment, intensity values for the four colors are captured contemporaneously.

One embodiment of a technique for interpolating color and/or depth information follows. Alternate techniques can also be used.

For the pixel X(m,n) in location (m,n):
case 1: (both m and n are odd integers)

$$IR = X(m,n);$$

$$G = \frac{X(m-1, n) + X(m+1, n)}{2};$$

if X(m,n−1) is RED, then $$R = X(m, n-1);$$

$$B = X(m, n+1);$$

else $$B = X(m, n-1);$$

$$R = X(m, n+1);$$

end if
case 2: (m is odd and n is even)

$$IR = \frac{X(m-1, n) + X(m+1, n) + X(m, n-1) + X(m, n+1)}{4};$$

$$G = \frac{X(m-1, n-1) + X(m+1, n-1) + X(m-1, n+1) + X(m+1, n+1)}{4};$$

if X(m,n) is RED, then $$R = X(m,n);$$

$$B = \frac{X(m-2, n) + X(m+2, n) + X(m, n-2) + X(m, n+2)}{4};$$

else $$B = X(m,n);$$

$$R = \frac{X(m-2, n) + X(m+2, n) + X(m, n-2) + X(m, n+2)}{4};$$

end if case 3: (m is even and n is odd)

$$IR = \frac{X(m, n-1) + X(m, n+1) + X(m-1, n) + X(m+1, n)}{4};$$

$$G = X(m,n);$$

if X(m−1,n−1) is RED, then $$R = \frac{X(m-1, n-1) + X(m+1, n+1)}{2};$$

$$B = \frac{X(m-1, n+1) + X(m+1, n-1)}{2};$$

else $$B = \frac{X(m-1, n-1) + X(m+1, n+1)}{2};$$

$$R = \frac{X(m-1, n+1) + X(m+1, n-1)}{2};$$

case 4: (both m and n are even integers)

$$IR = X(m,n);$$

$$G = \frac{X(m, n-1) + X(m, n+1)}{2};$$

if X(m−1,n) is RED, then $$R = X(m-1,n);$$

$$B = X(m+1,n);$$

else $$B = X(m-1,n);$$

$$R = X(m+1,n);$$

end if end

FIG. 7 illustrates one embodiment of a sub-sampling pattern that can be used to capture color and depth information. Use of a four-color (R, G, B, IR) mosaic pattern can be used to capture color information and depth information using a single sensor. As described in greater detail below, missing color intensity information can be interpolated using neighboring intensity values. In one embodiment, intensity values for the four colors are captured contemporaneously.

One embodiment of a technique for interpolating color and/or depth information follows. Alternate techniques can also be used.

For the pixel X(m,n) in location (m,n):
case 1: (both m and n are odd integers)

$$IR = \frac{X(m-1, n-1) + X(m-1, n+1) + X(m+1, n+1) + X(m+1, n-1)}{4};$$

$$R = \frac{X(m, n-1) + X(m, n+1)}{2};$$

$$G = \frac{X(m-1, n) + X(m+1, n)}{2};$$

$$B = X(m,n);$$

case 2: (m is odd and n is even)

$$IR = \frac{X(m-1, n) + X(m+1, n)}{2};$$

$$R = X(m,n);$$

$$G = \frac{X(m-1, n-1) + X(m+1, n-1) + X(m-1, n+1) + X(m+1, n+1)}{4};$$

$$B = \frac{X(m, n-1) + X(m, n+1)}{2};$$

case 3: (m is even and n is odd)

$$IR = \frac{X(m, n-1) + X(m, n+1)}{2};$$

$$R = \frac{X(m-1, n-1) + X(m+1, n-1) + X(m+1, n+1) + X(m+1, n-1)}{4};$$

$$G = X(m,n);$$

$$B = \frac{X(m-1, n) + X(m+1, n)}{2};$$

case 4: (both m and n are even integers)

$$IR = X(m,n);$$

$$R = \frac{X(m-1, n) + X(m+1, n)}{2};$$

$$G = \frac{X(m, n+1) + X(m, n-1)}{2};$$

$$B = \frac{X(m-1, n-1) + X(m+1, n+1) + X(m-1, n+1) + X(m+1, n-1)}{4};$$

end

FIG. 8 illustrates one embodiment of a sub-sampling pattern that can be used to capture color and depth information. Use of a four-color (R, G, B, IR) mosaic pattern can be used to capture color information and depth information using a single sensor. As described in greater detail below, missing color intensity information can be interpolated using neighboring intensity values. In one embodiment, intensity values for the four colors are captured contemporaneously.

One embodiment of a technique for interpolating color and/or depth information follows. Alternate techniques can also be used.

For the pixel X(m,n) in location (m,n):

case 1: (both m and n are odd integers)

$$IR = \frac{X(m-1, n) + X(m+1, n)}{2};$$

$$R = \frac{X(m-1, n-1) + X(m-1, n+1) + X(m+1, n+1) + X(m+1, n-1)}{4};$$

$$G = \frac{X(m, n-1) + X(m, n+1)}{2};$$

$$B = X(m,n);$$

case 2: (m is odd and n is even)

$$IR = \frac{X(m-1, n-1) + X(m+1, n-1) + X(m-1, n+1) + X(m+1, n+1)}{4};$$

$$R = \frac{X(m-1, n) + X(m+1, n)}{2};$$

$$G = X(m,n);$$

$$B = \frac{X(m, n-1) + X(m, n+1)}{2};$$

case 3: (m is even and n is odd)

$$IR = X(m,n);$$

$$R = X(m-1, n);$$

$$G = \frac{X(m-1, n-1) + X(m+1, n-1) + X(m-1, n+1) + X(m+1, n+1)}{4};$$

$$B = \frac{X(m-1, n) + X(m+1, n)}{2};$$

case 4: (both m and n are even integers)

$$IR = \frac{X(m, n-1) + X(m, n+1)}{2};$$

$$R = X(m,n);$$

$$G = \frac{X(m-1, n) + X(m+1, n)}{2};$$

$$B = \frac{X(m-1, n-1) + X(m+1, n+1) + X(m+1, n-1) + X(m-1, n+1)}{4};$$

end

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
a sensor unit to capture wavelength intensity data for a plurality of pixel locations wherein the sensor generates a value corresponding to an intensity of light from a selected range of wavelengths for the pixel locations and further wherein infrared intensity values are generated for a subset of the pixel locations wherein the sensor unit captures intensity data according to a predetermined pattern comprising:

| B  | R | B  | R |
|----|---|----|---|
| IR | G | IR | G |
| B  | R | B  | R |
| IR | G | IR | G | where R indicates red intensity information, G indicates green intensity information, B indicates blue intensity information and IR indicates infrared intensity information; and
an interpolation unit coupled with the sensor unit to interpolate intensity data to estimate intensity values not generated by the sensor.

2. The apparatus of claim 1 wherein the red, green, blue and infrared intensity information are captured substantially contemporaneously.

3. The apparatus of claim 1 further comprising:
a red pixel buffer coupled with the interpolation unit to store red intensity data;
a green pixel buffer coupled with the interpolation unit to store green intensity data;
a blue pixel buffer coupled with the interpolation unit to store blue intensity data; and
an infrared pixel buffer coupled with the interpolation unit to store infrared intensity data.

4. The apparatus of claim 3 further comprising a signal processing unit coupled to the red pixel data buffer, the green pixel data buffer, the blue pixel data buffer and the infrared pixel data buffer.

5. The apparatus of claim 1, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n) + X(m+1, n)}{2},$$

the red intensity corresponding to the location (m,n) is given by $$R = \frac{X(m, n-1) + X(m, n+1)}{2},$$

the green intensity corresponding to the location (m,n) is given by $$G = \frac{X(m-1, n-1) + X(m-1, n+1) + X(m+1, n-1) + X(m+1, n+1)}{4},$$

and the blue intensity corresponding to the location (m,n) is given by B=X(m,n).

6. The apparatus of claim 1, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n-1) + X(m+1, n-1) + X(m-1, n+1) + X(m+1, n+1)}{4},$$

the red intensity corresponding to the location (m,n) is given by R=X(m,n), the green intensity corresponding to the location (m,n) is given by $$G = \frac{X(m-1, n) + X(m+1, n)}{2},$$

and the blue intensity corresponding to the location (m,n) is given by $$B = \frac{X(m, n-1) + X(m, n+1)}{2}.$$

7. The apparatus of claim 1, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by IR=(m,n), the red intensity corresponding to the location (m,n) is given by $$R = \frac{X(m-1, n-1) + X(m+1, n-1) + X(m-1, n+1) + X(m+1, n+1)}{4},$$

the green intensity corresponding to the location (m,n) is given by $$G = \frac{X(m, n-1) + X(m, n+1)}{2},$$

and the blue intensity corresponding to the location (m,n) is given by $$B = \frac{X(m-1, n) + X(m+1, n)}{2}.$$

8. The apparatus of claim 1, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m, n-1) + X(m, n+1)}{2},$$

the red intensity corresponding to the location (m,n) is given by $$R = \frac{X(m-1, n) + X(m+1, n)}{2},$$

the green intensity corresponding to the location (m,n) is given by G=X(m,n), and the blue intensity corresponding to the location (m,n) is given by $$B = \frac{X(m-1, n-1) + X(m+1, n-1) + X(m-1, n+1) + X(m+1, n+1)}{4}.$$

9. An apparatus comprising:
a sensor unit to capture wavelength intensity data for a plurality of pixel locations wherein the sensor generates a value corresponding to an intensity of light from a selected range of wavelengths for the pixel locations and further wherein infrared intensity values are generated for a subset of the pixel locations wherein the sensor unit captures intensity data according to a predetermined pattern comprising:

| IR | R  | IR | B  |
|----|----|----|----|
| G  | IR | G  | IR |
| IR | B  | IR | R  |
| G  | IR | G  | IR | where R indicates red intensity information, G indicates green intensity information, B indicates blue intensity information and IR indicates infrared intensity information; and an interpolation unit coupled with the sensor unit to interpolate intensity data to estimate intensity values not generated by the sensor.

10. The apparatus of claim 9, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by IR=X(m,n), and the green intensity corresponding to the location (m,n) is given by $$G = \frac{X(m-1, n) + X(m+1, n)}{2},$$

and further wherein if the pixel at location (m,n−1) is red, the blue intensity corresponding to the location (m,n) is given by B=X(m,n+1) and the red intensity corresponding to the location (m,n) is given by R=X(m,n−1), and if the pixel at location (m,n−1) is blue, the red intensity corresponding to the location (m,n) is given by R=X(m,n+1) and the blue intensity corresponding to the location (m,n) is given by B=X(m,n−1).

11. The apparatus of claim 9, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n) + X(m+1, n) + X(m, n-1) + X(m, n+1)}{4}$$

and green intensity corresponding to the location (m,n) is given by $$G = \frac{X(m-1, n-1) + X(m+1, n-1) + X(m-1, n+1) + X(m+1, n+1)}{4}$$

and further wherein if the pixel at location (m,n) is red, the blue intensity corresponding to the location (m,n) is given by $$B = \frac{X(m-2, n) + X(m+2, n) + X(m, n-2) + X(m, n+2)}{4}$$

and the red intensity corresponding to the location (m,n) is given by R=X(m,n), and if the pixel at location (m,n) is blue, the red intensity corresponding to the location (m,n) is given by B=X(m,n) and the blue intensity corresponding to the location (m,n) is given by $$R = \frac{X(m-2, n) + X(m+2, n) + X(m, n-2) + X(m, n+2)}{4}.$$

12. The apparatus of claim 9, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by $$IR = \frac{X(m, n-1) + X(m, n+1) + X(m-1, n) + X(m+1, n)}{4}$$

and green intensity corresponding to the location (m,n) is given by G=X(m,n) and further wherein if the pixel at location (m−1,n−1) is red, the blue intensity corresponding to the location (m,n) is given by $$B = \frac{X(m-1, n+1) + X(m+1, n-1)}{2}$$

and the red intensity corresponding to the location (m,n) is given by $$R = \frac{X(m-1, n-1) + X(m+1, n+1)}{2},$$

and if the pixel at location (m−1,n−1) is blue, the red intensity corresponding to the location (m,n) is given by $$R = \frac{X(m-1, n+1) + (m+1, n-1)}{2}$$

and the blue intensity corresponding to the location (m,n) is given by $$B = \frac{X(m-1, n-1) + X(m+1, n+1)}{2}.$$

13. The apparatus of claim 9, wherein for a pixel in the predetermined pixel pattern in a location (m,n) where m indicates a row and n indicates a column and X(m,n) is the intensity corresponding to the pixel in the location (m,n), if m and n are both even integers, the infrared intensity corresponding to the location (m,n) is given by IR=X(m,n), and the green intensity corresponding to the location (m,n) is given by $$G = \frac{X(m, n-1) + X(m, n+1)}{2}$$

and further wherein if the pixel at location (m−1,n) is red, the blue intensity corresponding to the location (m,n) is given by B=X(m+1,n) and the red intensity corresponding to the location (m,n) is given by R=X(m−1,n), and if the pixel at location (m−1,n+1) is blue, the red intensity corresponding to the location (m,n) is given by R=X(m+1,n) and the blue intensity corresponding to the location (m,n) is given by B=X(m−1,n).

14. An apparatus comprising:

a sensor unit to capture wavelength intensity data for a plurality of pixel locations wherein the sensor generates a value corresponding to an intensity of light from a selected range of wavelengths for the pixel locations and further wherein infrared intensity values are generated for a subset of the pixel locations wherein the sensor unit captures intensity data according to a predetermined pattern comprising:

| B | R | B | R |
|---|---|---|---|
| G | IR | G | IR |
| B | R | B | R |
| G | IR | G | IR | where R indicates red intensity information, G indicates green intensity information, B indicates blue intensity information and IR indicates infrared intensity information; and
an interpolation unit coupled with the sensor unit to interpolate intensity data to estimate intensity values not generated by the sensor.

15. The apparatus of claim 14, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n-1) + X(m-1, n+1) + X(m+1, n+1) + X(m+1, n-1)}{4},$$

the red intensity corresponding to the location (m,n) is given by $$R = \frac{X(m, n-1) + X(m, n+1)}{2},$$

the green intensity corresponding to the location (m,n) is given by $$G = \frac{X(m-1, n) + X(m+1, n)}{2},$$

and the blue intensity corresponding to the location (m,n) is given by B=X(m,n).

16. The apparatus of claim 14, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n) + X(m+1, n)}{2},$$

the red intensity corresponding to the location (m,n) is given by R=X(m,n), the green intensity corresponding to the location (m,n) is given by $$G = \frac{X(m-1, n-1) + X(m+1, n-1) + X(m-1, n+1) + X(m+1, n+1)}{4},$$

and the blue intensity corresponding to the location (m,n) is given by $$B = \frac{X(m, n-1) + X(m, n+1)}{2}.$$

17. The apparatus of claim 14, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by $$IR = \frac{X(m, n-1) + X(m, n+1)}{2},$$

the red intensity corresponding to the location (m,n) is given by $$R = \frac{X(m-1, n-1) + X(m+1, n-1) + X(m+1, n+1) + X(m+1, n-1)}{4},$$

the green intensity corresponding to the location (m,n) is given by G=X(m,n), and the blue intensity corresponding to the location (m,n) is given by $$B = \frac{X(m-1, n) + X(m+1, n)}{2}.$$

18. The apparatus of claim 14, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by IR=X(m,n), the red intensity corresponding to the location (m,n) is given by $$R = \frac{X(m-1, n) + X(m+1, n)}{2},$$

the green intensity corresponding to the location (m,n) is given by $$G = \frac{X(m, n+1) + X(m, n-1)}{2},$$

and the blue intensity corresponding to the location (m,n) is given by $$B = \frac{X(m-1, n-1) + X(m+1, n+1) + X(m-1, n+1) + X(m+1, n-1)}{4}.$$

19. An apparatus comprising:
a sensor unit to capture wavelength intensity data for a plurality of pixel locations wherein the sensor generates a value corresponding to an intensity of light from a selected range of wavelengths for the pixel locations and further wherein infrared intensity values are generated for a subset of the pixel locations wherein the sensor unit captures intensity data according to a predetermined pattern comprising:

| B  | G | B  | G |
|----|---|----|---|
| IR | R | IR | R |
| B  | G | B  | G |
| IR | R | IR | R | where R indicates red intensity information, G indicates green intensity information, B indicates blue intensity information and IR indicates infrared intensity information; and
an interpolation unit coupled with the sensor unit to interpolate intensity data to estimate intensity values not generated by the sensor.

20. The apparatus of claim 19, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n) + X(m+1, n)}{2},$$

the red intensity corresponding to the location (m,n) is given by $$R = \frac{X(m-1, n-1) + X(m-1, n+1) + X(m+1, n+1) + X(m+1, n-1)}{4},$$

the green intensity corresponding to the location (m,n) is given by $$G = \frac{X(m, n-1) + X(m, n+1)}{2},$$

and the blue intensity corresponding to the location (m,n) is given by B=X(m,n).

21. The apparatus of claim 19, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n-1) + X(m+1, n-1) + X(m-1, n+1) + X(m+1, n+1)}{4},$$

the red intensity corresponding to the location (m,n) is given by $$R = \frac{X(m-1, n) + X(m+1, n)}{2},$$

the green intensity corresponding to the location (m,n) is given by G=X(m,n), and the blue intensity corresponding to the location (m,n) is given by $$B = \frac{X(m, n-1) + X(m, n+1)}{2}.$$

22. The apparatus of claim 19, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by IR=X(m,n), the red intensity corresponding to the location (m,n) is given by R=X(m−1,n), the green intensity corresponding to the location (m,n) is given by $$G = \frac{X(m-1, n-1) + X(m+1, n-1) + X(m-1, n+1) + X(m+1, n+1)}{4},$$

and the blue intensity corresponding to the location (m,n) is given by $$B = \frac{X(m-1, n) + X(m+1, n)}{2}.$$

23. The apparatus of claim 19, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m, n-1) + X(m, n+1)}{2},$$

the red intensity corresponding to the location (m,n) is given by R=X(m,n), the green intensity corresponding to the location (m,n) is given by $$G = \frac{X(m-1, n) + X(m+1, n)}{2},$$

and the blue intensity corresponding to the location (m,n) is given by $$B = \frac{X(m-1, n-1) + X(m+1, n+1) + X(m+1, n-1) + X(m-1, n+1)}{4}.$$

24. An apparatus comprising:
a complementary metal-oxide semiconductor (CMOS) sensor to capture an array of pixel data; and
a color filter array (CFA) to pass selected wavelength ranges to respective pixel locations of the CMOS sensor according to a predetermined pattern, wherein the wavelength ranges include at least infrared wavelengths for one or more pixel locations wherein the predetermined pattern comprises:

| B  | R | B  | R |
|----|---|----|---|
| IR | G | IR | G |
| B  | R | B  | R |
| IR | G | IR | G | where R indicates red intensity information, G indicates green intensity information, B indicates blue intensity information and IR indicates infrared intensity information.

25. The apparatus of claim 24, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n) + X(m+1, n)}{2},$$

the red intensity corresponding to the location (m,n) is given by $$R = \frac{X(m, n-1) + X(m, n+1)}{2},$$

the green intensity corresponding to the location (m,n) is given by $$G = \frac{X(m-1, n-1) + X(m-1, n+1) + X(m+1, n-1) + X(m+1, n+1)}{4},$$

and the blue intensity corresponding to the location (m,n) is given by B=X(m,n).

26. The apparatus of claim 24, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n-1) + X(m+1, n-1) + X(m-1, n+1) + X(m+1, n+1)}{4},$$

the red intensity corresponding to the location (m,n) is given by R=X(m,n), the green intensity corresponding to the location (m,n) is given by $$G = \frac{X(m-1, n) + X(m+1, n)}{2},$$

and the blue intensity corresponding to the location (m,n) is given by $$B = \frac{X(m, n-1) + X(m, n+1)}{2}.$$

27. The apparatus of claim 24, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by IR=(m,n), the red intensity corresponding to the location (m,n) is given by $$R = \frac{X(m-1, n-1) + X(m+1, n-1) + X(m-1, n+1) + X(m+1, n+1)}{4},$$

the green intensity corresponding to the location (m,n) is given by $$G = \frac{X(m, n-1) + X(m, n+1)}{2},$$

and the blue intensity corresponding to the location (m,n) is given by $$B = \frac{X(m-1, n) + X(m+1, n)}{2}.$$

28. The apparatus of claim 24, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m, n-1) + X(m, n+1)}{2},$$

the red intensity corresponding to the location (m,n) is given by $$R = \frac{X(m-1, n) + X(m+1, n)}{2},$$

the green intensity corresponding to the location (m,n) is given by G=X(m,n), and the blue intensity corresponding to the location (m,n) is given by $$B = \frac{X(m-1, n-1) + X(m+1, n-1) + X(m-1, n+1) + X(m+1, n+1)}{4}.$$

29. An apparatus comprising:
a complementary metal-oxide semiconductor (CMOS) sensor to capture an array of pixel data; and
a color filter array (CFA) to pass selected wavelength ranges to respective pixel locations of the CMOS sensor according to a predetermined pattern, wherein the wavelength ranges include at least infrared wavelengths for one or more pixel locations wherein the predetermined pattern comprises:

| IR | R  | IR | B  |
|----|----|----|----|
| G  | IR | G  | IR |
| IR | B  | IR | R  |
| G  | IR | G  | IR | where R indicates red intensity information, G indicates green intensity information, B indicates blue intensity information and IR indicates infrared intensity information.

30. The apparatus of claim 29, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by IR=X(m,n), and the green intensity corresponding to the location (m,n) is given by $$G = \frac{X(m-1, n) + X(m+1, n)}{2},$$

and further wherein if the pixel at location (m,n−1) is red, the blue intensity corresponding to the location (m,n) is given by B=X(m,n+1) and the red intensity corresponding to the location (m,n) is given by R=X(m,n−1), and if the pixel at location (m,n−1) is blue, the red intensity corresponding to the location (m,n) is given by R=X(m,n+1) and the blue intensity corresponding to the location (m,n) is given by B=X(m,n−1).

31. The apparatus of claim 29, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n) + X(m+1, n) + X(m, n-1) + X(m, n+1)}{4}$$

and green intensity corresponding to the location (m,n) is given by $$G = \frac{X(m-1, n-1) + X(m+1, n-1) + X(m-1, n+1) + X(m+1, n+1)}{4}$$

and further wherein if the pixel at location (m,n) is red, the blue intensity corresponding to the location (m,n) is given by $$B = \frac{X(m-2, n) + X(m+2, n) + X(m, n-2) + X(m, n+2)}{4}$$

and the red intensity corresponding to the location (m,n) is given by R=X(m,n), and if the pixel at location (m,n) is blue, the red intensity corresponding to the location (m,n) is given by B=X(m,n) and the blue intensity corresponding to the location (m,n) is given by $$R = \frac{X(m-2, n) + X(m+2, n) + X(m, n-2) + X(m, n+2)}{4}.$$

32. The apparatus of claim 29, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by $$IR = \frac{X(m, n-1) + X(m, n+1) + X(m-1, n) + X(m+1, n)}{4}$$

and green intensity corresponding to the location (m,n) is given by G=X(m,n) and further wherein if the pixel at location (m−1,n−1) is red, the blue intensity corresponding to the location (m,n) is given by $$B = \frac{X(m-1, n+1) + X(m+1, n-1)}{2}$$

and the red intensity corresponding to the location (m,n) is given by $$R = \frac{X(m-1, n-1) + X(m+1, n+1)}{2},$$

and if the pixel at location (m−1,n−1) is blue, the red intensity corresponding to the location (m,n) is given by $$R = \frac{X(m-1, n+1) + (m+1, n-1)}{2}$$

and the blue intensity corresponding to the location (m,n) is given by $$B = \frac{X(m-1, n-1) + X(m+1, n+1)}{2}.$$

33. The apparatus of claim 29, wherein for a pixel in the predetermined pixel pattern in a location (m,n) where m indicates a row and n indicates a column and X(m,n) is the intensity corresponding to the pixel in the location (m,n), if m and n are both even integers, the infrared intensity corresponding to the location (m,n) is given by IR=X(m,n), and the green intensity corresponding to the location (m,n) is given by $$G = \frac{X(m, n-1) + X(m, n+1)}{2}$$

and further wherein if the pixel at location (m−1,n) is red, the blue intensity corresponding to the location (m,n) is given by B=X(m+1,n) and the red intensity corresponding to the location (m,n) is given by R=X(m−1,n), and if the pixel at location (m−1,n+1) is blue, the red intensity corresponding to the location (m,n) is given by R=X(m+1,n) and the blue intensity corresponding to the location (m,n) is given by B=X(m−1,n).

34. An apparatus comprising:
a complementary metal-oxide semiconductor (CMOS) sensor to capture an array of pixel data; and
a color filter array (CFA) to pass selected wavelength ranges to respective pixel locations of the CMOS sensor according to a predetermined pattern, wherein the wavelength ranges include at least infrared wavelengths for one or more pixel locations the predetermined pattern comprises:

| B | R | B | R |
|---|---|---|---|
| G | IR | G | IR |
| B | R | B | R |
| G | IR | G | IR | where R indicates red intensity information, G indicates green intensity information, B indicates blue intensity information and IR indicates infrared intensity information.

35. The apparatus of claim 34, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n-1) + X(m-1, n+1) + X(m+1, n+1) + X(m+1, n-1)}{4},$$

the red intensity corresponding to the location (m,n) is given by $$R = \frac{X(m, n-1) + X(m, n+1)}{2},$$

the green intensity corresponding to the location (m,n) is given by $$G = \frac{X(m-1, n) + X(m+1, n)}{2},$$

and the blue intensity corresponding to the location (m,n) is given by B=X(m,n).

36. The apparatus of claim 34, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n) + X(m+1, n)}{2},$$

the red intensity corresponding to the location (m,n) is given by R=X(m,n), the green intensity corresponding to the location (m,n) is given by $$G = \frac{X(m-1, n-1) + X(m+1, n-1) + X(m-1, n+1) + X(m+1, n+1)}{4},$$

and the blue intensity corresponding to the location (m,n) is given by $$B = \frac{X(m, n-1) + X(m, n+1)}{2}.$$

37. The apparatus of claim 34, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by $$IR = \frac{X(m, n-1) + X(m, n+1)}{2},$$

the red intensity corresponding to the location (m,n) is given by $$R = \frac{X(m-1, n-1) + X(m+1, n-1) + X(m+1, n+1) + X(m+1, n-1)}{4},$$

the green intensity corresponding to the location (m,n) is given by G=X(m,n), and the blue intensity corresponding to the location (m,n) is given by $$B = \frac{X(m-1, n) + X(m+1, n)}{2}.$$

38. The apparatus of claim 34, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by IR=X(m,n), the red intensity corresponding to the location (m,n) is given by $$R = \frac{X(m-1, n) + X(m+1, n)}{2},$$

the green intensity corresponding to the location (m,n) is given by $$G = \frac{X(m, n+1) + X(m, n-1)}{2},$$

and the blue intensity corresponding to the location (m,n) is given by $$B = \frac{X(m-1, n-1) + X(m+1, n+1) + X(m-1, n+1) + X(m+1, n-1)}{4}.$$

39. An apparatus comprising:
a complementary metal-oxide semiconductor (CMOS) sensor to capture an array of pixel data; and
a color filter array (CFA) to pass selected wavelength ranges to respective pixel locations of the CMOS sensor according to a predetermined pattern, wherein the wavelength ranges include at least infrared wavelengths for one or more pixel locations wherein the predetermined pattern comprises:

| B | G | B | G |
| IR | R | IR | R |
| B | G | B | G |
| IR | R | IR | R | where R indicates red intensity information, G indicates green intensity information, B indicates blue intensity information and IR indicates infrared intensity information.

40. The apparatus of claim 39, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m-1, n) + X(m+1, n)}{2},$$

the red intensity corresponding to the location (m,n) is given by $$R = \frac{X(m-1, n-1) + X(m-1, n+1) + X(m+1, n+1) + X(m+1, n-1)}{4},$$

the green intensity corresponding to the location (m,n) is given by $$G = \frac{X(m, n-1) + X(m, n+1)}{2},$$

and the blue intensity corresponding to the location (m,n) is given by B=X(m,n).

41. The apparatus of claim 39, wherein for a pixel in the predetermined pixel pattern in a location (m,n) where m indicates a row and n indicates a column and X(m,n) is the intensity corresponding to the pixel in the location (m,n), if m is an odd integer and n is an even integer, the infrared intensity corresponding to the location (m,n) is given by $$IR = \frac{X(m-1, n-1) + X(m+1, n-1) + X(m-1, n+1) + X(m+1, n+1)}{4},$$

the red intensity corresponding to the location (m,n) is given by $$R = \frac{X(m-1, n) + X(m+1, n)}{2},$$

the green intensity corresponding to the location (m,n) is given by G=X(m,n), and the blue intensity corresponding to the location (m,n) is given by $$B = \frac{X(m, n-1) + X(m, n+1)}{2}.$$

42. The apparatus of claim 39, wherein for a pixel in the predetermined pixel pattern in a location (m,n) where m indicates a row and n indicates a column and X(m,n) is the intensity corresponding to the pixel in the location (m,n), if m is an even integer and n is an odd integer, the infrared intensity corresponding to the location (m,n) is given by IR=X(m,n), the red intensity corresponding to the location (m,n) is given by R=X(m−1,n), the green intensity corresponding to the location (m,n) is given by $$G = \frac{X(m-1, n-1) + X(m+1, n-1) + X(m-1, n+1) + X(m+1, n+1)}{4},$$

and the blue intensity corresponding to the location (m,n) is given by $$B = \frac{X(m-1, n) + X(m+1, n)}{2}.$$

43. The apparatus of claim 39, wherein for a pixel in the predetermined pixel pattern in a location (m,n) where m indicates a row and n indicates a column and X(m,n) is the intensity corresponding to the pixel in the location (m,n), if m and n are both odd integers, the infrared intensity corresponding to the location (m,n) is given by $$IR = \frac{X(m, n-1) + X(m, n+1)}{2},$$

the red intensity corresponding to the location (m,n) is given by R=X(m,n), the green intensity corresponding to the location (m,n) is given by $$G = \frac{X(m-1, n) + X(m+1, n)}{2},$$

and the blue intensity corresponding to the location (m,n) is given by $$B = \frac{X(m-1, n-1) + X(m+1, n+1) + X(m+1, n-1) + X(m-1, n+1)}{4}.$$

44. A sensor that receives pixel data representing color intensity values for a plurality of pixel locations of a scene to be captured according to a predetermined pattern, wherein one or more of the color intensity values corresponds to intensity of light having infrared wavelengths wherein the predetermined pattern comprises:

| B  | R | B  | R |
|----|---|----|---|
| IR | G | IR | G |
| B  | R | B  | R |
| IR | G | IR | G | where R indicates red intensity information, G indicates green intensity information, B indicates blue intensity information and IR indicates infrared intensity information.

45. The sensor of claim 44 wherein red intensity values, green intensity values, blue intensity values and infrared intensity values are capture substantially contemporaneously.

46. A sensor that receives pixel data representing color intensity values for a plurality of pixel locations of a scene to be captured according to a predetermined pattern, wherein one or more of the color intensity values corresponds to intensity of light having infrared wavelengths wherein the predetermined pattern comprises:

| IR | R  | IR | B  |
|----|----|----|----|
| G  | IR | G  | IR |
| IR | B  | IR | R  |
| G  | IR | G  | IR | where R indicates red intensity information, G indicates green intensity information, B indicates blue intensity information and IR indicates infrared intensity information.

47. A sensor that receives pixel data representing color intensity values for a plurality of pixel locations of a scene to be captured according to a predetermined pattern, wherein one or more of the color intensity values corresponds to intensity of light having infrared wavelengths wherein the predetermined pattern comprises:

| B | R  | B | R  |
|---|----|---|----|
| G | IR | G | IR |
| B | R  | B | R  |
| G | IR | G | IR | where R indicates red intensity information, G indicates green intensity information, B indicates blue intensity information and IR indicates infrared intensity information.

48. A sensor that receives pixel data representing color intensity values for a plurality of pixel locations of a scene to be captured according to a predetermined pattern, wherein one or more of the color intensity values corresponds to intensity of light having infrared wavelengths wherein the predetermined pattern comprises:

| B  | G | B  | G |
|----|---|----|---|
| IR | R | IR | R |
| B  | G | B  | G |
| IR | R | IR | R | where R indicates red intensity information, G indicates green intensity information, B indicates blue intensity information and IR indicates infrared intensity information.

* * * * *